United States Patent [19]
Bachand et al.

[11] Patent Number: 5,855,777
[45] Date of Patent: *Jan. 5, 1999

[54] MULTI-CHAMBER WATER PURIFICATION DEVICE AND METHOD OF USING THE SAME

[75] Inventors: Steven P. Bachand, Pawtucket; Francis M Lubrano, Narragansett; Raymond P. Denkewicz, Jr., Warwick, all of R.I.

[73] Assignee: Fountainhead Technologies, Inc., Smithfield, R.I.

[*] Notice: This patent issued on a continued prosecution application filed under 37 CFR 1.53(d), and is subject to the twenty year patent term provisions of 35 U.S.C. 154(a)(2).

[21] Appl. No.: 742,778
[22] Filed: Oct. 31, 1996
[51] Int. Cl.$^6$ .................................................. C02F 1/72
[52] U.S. Cl. ............................................ 210/205; 210/253
[58] Field of Search ................................. 210/192, 198.1, 210/199, 205, 206, 253, 753, 758, 764

[56] References Cited

U.S. PATENT DOCUMENTS

| 3,436,343 | 4/1969 | Smith ...................................... 210/253 |
| 4,198,296 | 4/1980 | Doumas et al. . |
| 4,780,197 | 10/1988 | Schuman . |
| 4,894,149 | 1/1990 | Block ...................................... 210/253 |
| 5,019,257 | 5/1991 | Suzuki et al. ........................... 210/253 |
| 5,053,206 | 10/1991 | Maglio et al. . |
| 5,129,452 | 3/1993 | Mitsui et al. ............................ 210/760 |
| 5,352,369 | 10/1994 | Heinig, Jr. ............................... 210/760 |
| 5,656,159 | 8/1997 | Spencer et al. . |
| 5,660,802 | 8/1997 | Archer et al. ........................... 210/764 |

FOREIGN PATENT DOCUMENTS

| 2463970 | 2/1981 | France . |
| 4422709 | 1/1996 | Germany . |
| WO 9614093 | 5/1993 | WIPO . |

*Primary Examiner*—Jay H. Woo
*Assistant Examiner*—Betsey J. Morrison
*Attorney, Agent, or Firm*—Dean W. Russell; Kilpatrick Stockton LLP

[57] ABSTRACT

A flow-through water purification method and device, the device having an inlet, an outlet, first and second internal chambers, and water purification materials in the two chambers. In one aspect, water flowing through the first chamber does not flow through the second chamber, and water flowing through the second chamber does not flow through the first chamber. The water purification material in the first chamber is restricted from contacting the water purification material in the second chamber. In a preferred embodiment the two materials are a silver-containing material and an oxidizing material such as chlorine, the device being used to treat pool water. Flow regulation means in the form of selectable output orifice areas are disclosed.

11 Claims, 3 Drawing Sheets

MULTI-CHAMBER WATER PURIFICATION DEVICE AND METHOD OF USING THE SAME

BACKGROUND OF THE INVENTION

The invention relates to a water purifier for treating water.

Water must be effectively treated before it can be used in confined volumes such as swimming pools, hot tubs and spas, which are highly susceptible to rapid microorganism growth and can become health hazards if not properly and regularly treated.

Perhaps the most common method of treating water to kill microorganisms is to add chlorine. Chlorine is readily available and can be added directly to the water in tablet, liquid, or powder form. Because chlorine is added manually, treatment schedules can be irregular. Even with regular treatment schedules, high initial concentrations of chlorine are required to effectively ensure a minimum level of chlorine between treatments. However, high usage levels of chlorine can create objectionable odor and can cause skin and eye irritations.

In recent years, alternative water treatment methods have been developed that employ flow-through water purifiers that kill microorganisms in the water flowing through the purifiers. Examples of this type of water purifier are described in the applicant's prior U.S. Pat. No. 4,608,247 and pending U.S. Ser. No. 08/439,214, which are incorporated herein by reference. These systems have advantageously employed flow-through canisters containing compatible water purification materials to effectively kill most types of microorganisms common to swimming pools, hot tubs, and spas. However, certain water purification materials are incompatible when placed in contact with each other. Incompatible water purification materials include silver-containing materials and oxidizing materials.

Suitable oxidizing materials include halogens, such as chlorine or bromine, or peroxides such as potassium peroxymonosulfate. Suitable silver-containing materials are described, for example, in U.S. Pat. No. 5,352,369 and in U.S. Ser. No. 08/628,405, entitled "Self-Regulating Water Purification Composition" and filed Apr. 5, 1996, which are incorporated herein by reference. Examples of these purification materials include silver metal on a support. The support can be a ceramic and can include an inorganic oxide, e.g., an aluminum oxide. The silver can be chemically deposited on the ceramic support or dispersed as a powder, shavings, or turnings with the ceramic support. The purification material can include a second metal, preferably zinc, copper, aluminum, iron, or manganese, most preferably, zinc.

SUMMARY OF THE INVENTION

In one aspect, the invention features a flow-through water purification device having an inlet, an outlet, first and second internal chambers, and water purifying materials in the two chambers. During use of the device, water flowing through the first chamber does not flow through the second chamber, and water flowing through the second chamber does not flow through the first chamber. The water purifying material in the first chamber does not contact the water purifying material in the second chamber.

The purifying material in the first chamber preferably is different from the material in the second chamber.

In another aspect, the invention features a flow-through water purification device having first and second internal chambers, in which the first chamber contains a silver-containing material, and the second chamber contains an oxidizing material. The device may be constructed to direct incoming water through both chambers and to restrict the silver-containing material from contacting the oxidizing material.

The device may also include a flow regulator that controls the flow of water through a chamber. In the current configuration, the regulator has selectable outlet orifice areas.

In another aspect, the invention features a method of purifying pool water. The method includes flowing the water through an inlet of a device, separating the flow of water into a first flow that enters a first chamber and a second flow that enters a second chamber, passing the water in the first flow across a purifying material in the first chamber, and passing the water in the second flow across a purifying material in the second chamber. The method may include recombining the purified first and second flows of water into a flow that leaves the device through an outlet.

In another aspect, the invention features a method of purifying pool water including the steps of flowing the water through a device having an inlet, an outlet, and two internal chambers, and passing water across a silver-containing material within a first chamber, and across an oxidizing material within a second chamber.

Some water purification materials (e.g., incompatible water purification materials such as silver-containing materials and oxidizing materials) will adversely react with each other if placed together in contact, as in a traditional purification canister, significantly reducing their effectiveness. By including these materials in separate chambers, the incompatible water purification materials can be employed to advantageously treat pool water within the same device. Furthermore, by regulating the flow across one of the purification materials, the device can be employed to selectively regulate the ratio of the amount of treatment the water receives from each purifying material.

Other features and advantages of the invention will be apparent from the description of the preferred embodiment thereof, and from the claims.

DESCRIPTION OF THE PREFERRED EMBODIMENT

Figure 1:
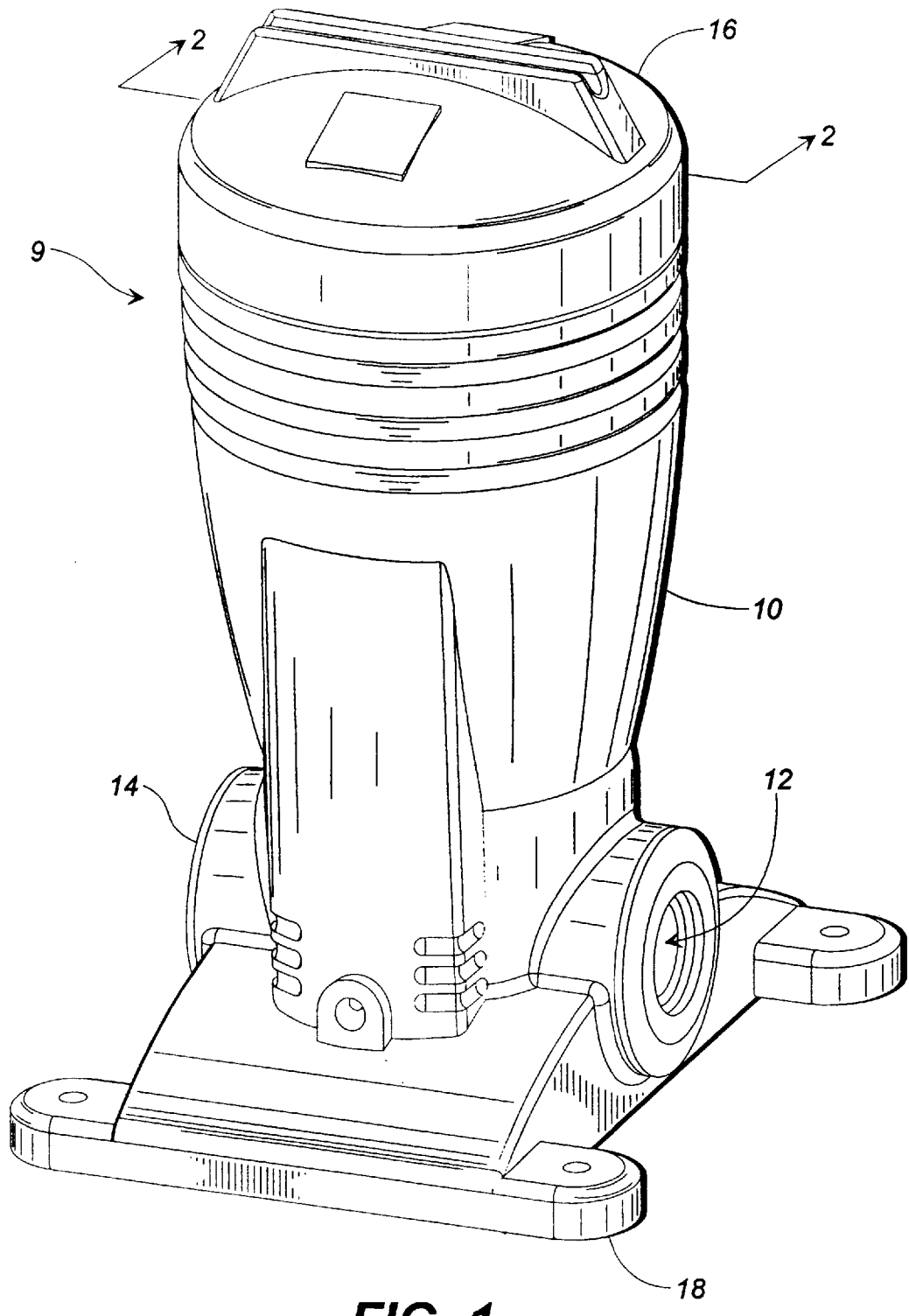
FIG. 1 is a perspective view of a water purification device of the invention.

Referring to FIG. 1, a flow-through water purifier 9 has a housing 10 with a water inlet 12 and outlet 14. Water to be purified flows from the inlet through internal water purification materials to the outlet. The housing also has a removable cover 16 for convenient replacement of the purification materials, and mounting tabs 18 at the base of the housing for securing the purifier as desired.

Figure 2:
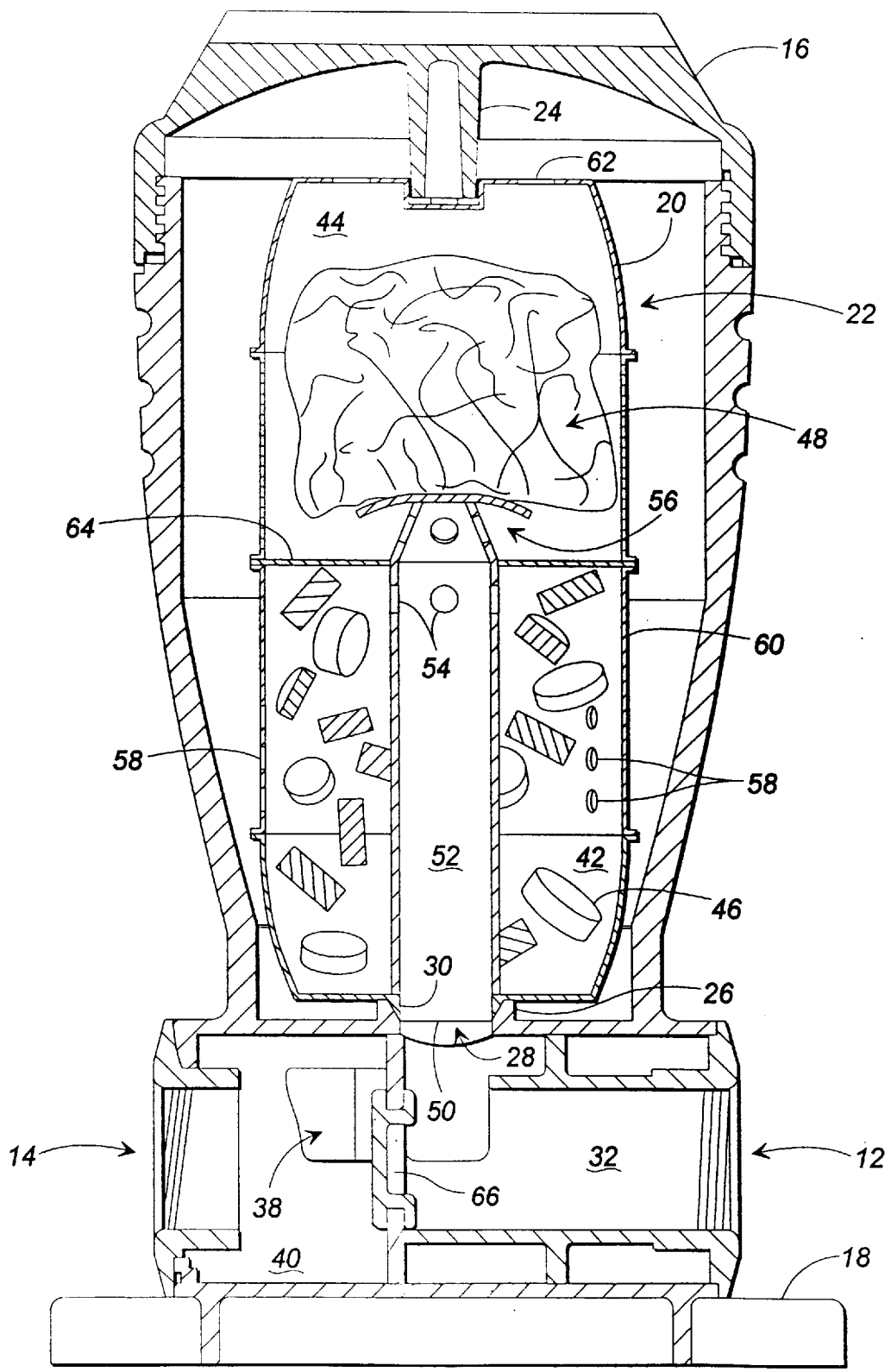
FIG. 2 is a cross-sectional view, taken along line 2—2 in FIG. 1.

Referring to FIG. 2, an internal canister 20 is positioned within cavity 22 and held in place by a downwardly extending boss 24 on the cover 16 that holds the canister against an upwardly projecting lip 26 about opening 28 at the bottom of cavity 22, forming a seal between the lip and canister inlet seal 30.

Incoming water flows under pressure from an external source (not shown) into the purifier at inlet 12, through passageway 32 and into canister 20 through opening 28. After passing through water purification materials within the canister (as discussed below), the water flows out of the canister into cavity 22, through port 38 and output passageway 40, and exits the purifier through outlet 14.

A flexible variable orifice flow regulator 66 between inlet passageway 32 and outlet passageway 40 controls the flow through the canister, allowing a greater amount of entering water to bypass the canister under high entrance flow conditions.

Canister 20 contains separate chambers 42 and 44 with different water purification materials 46 and 48, respectively. Water entering the canister inlet 50 flows along an inlet tube 52 through the center of the canister. Near the upper end of tube 52, some of the water flows into lower chamber 42 through side ports 54, while the remainder continues up tube 52 to enter upper chamber 44 through a diffuser 56. Water leaves lower chamber 42 through openings 58 positioned within the side wall 60 of canister 20, flowing out into cavity 22. Water leaves upper chamber 44 through openings 62 in the top of the canister, also flowing out into cavity 22. In this manner two separate, effectively parallel flow paths are defined from inlet tube 52 to cavity 22, one through each of cavities 42 and 44.

Between the two chambers is a solid barrier 64 that keeps the water purification materials within the two chambers from coming into undesirable physical contact with each other. The barrier is a rigid impermeable membrane, connected to inlet tube 52 and canister side wall 60, that prevents the transfer of water purification materials or water directly between the two purification chambers 42 and 44.

The flow of water through each chamber 42 and 44 is individually regulated by selectively opening various combinations of outlet ports 58 and 62, respectively, during canister installation. These outlet ports constitute selectable outlet orifice areas. Outlet-covering adhesive port covers or labels (not shown) adhered to the outside of canister 20 during manufacture may be peeled off by the user to expose a desired number of outlet ports 58 and 62. Alternatively, break-away plugs (not shown) can be removed to selectively open a desirable number of outlet ports 58 and 62. As another alternative, a c-clamp or slotted sleeve (not shown) around canister 20 can be rotated to expose a desired number of outlet ports 58 and 62. In this way the effective outlet orifice area from each chamber may be selected from among a set of possible values, thereby regulating the rate of exposure of the water to each of the water purification materials 46 and 48 depending on the needs of the application.

Figure 3:
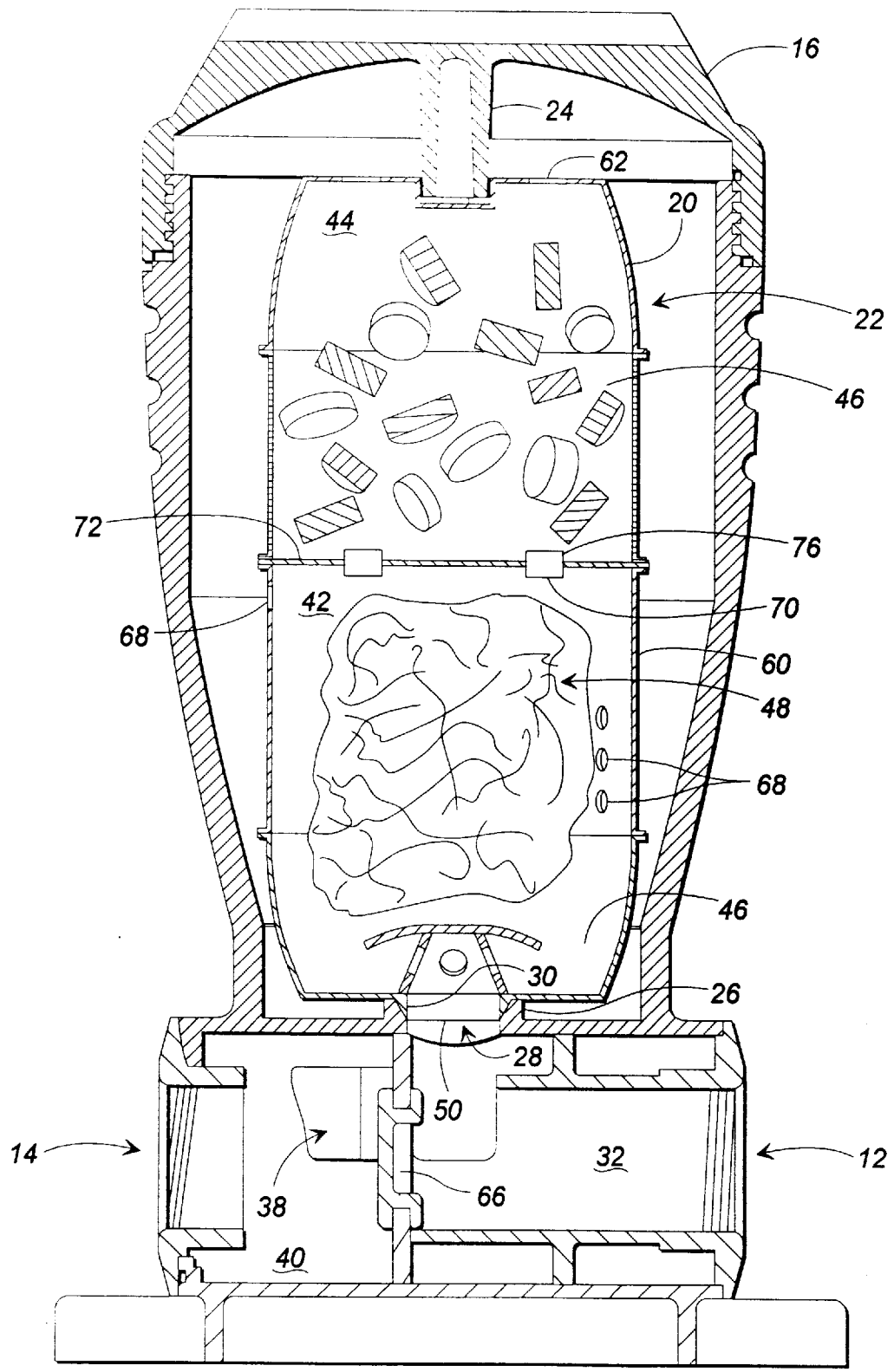
FIG. 3 is a cross-sectional view of another embodiment of the invention, also taken along line 2—2 in FIG. 1.

FIG. 3 shows another configuration of the purification canister 20, arranged to permit flow directly between the two purification chambers 42 and 44. In this embodiment, incoming water enters lower chamber 42 through opening 50. The water flows out of the lower chamber either directly out of the canister into cavity 22 through openings 68 in the side wall of the canister, or into upper chamber 44 through openings 70 in barrier 72, and from the upper chamber out into cavity 22 through holes 62. Flow through the upper chamber is regulated in this embodiment by selectively opening a desired number of upper outlet holes 62, e.g. by selectively opening various output ports as described above. As in the previous embodiment, the internal barrier 72 prevents direct physical contact between the two water purification materials 46 and 48. In this embodiment, material 48 in chamber 42 is a silver-containing material and material 46 in chamber 44 is an oxidizing material. The openings 70 are fitted with one-way flow valves (e.g., ball valves or flaps) which allow water to pass freely in one direction while preventing back-mixing of water rich in oxidizing material with the silver-containing material in chamber 42.

Water purification materials 46 and 48 may be in powder, granule, tablet, stick, monolithic ceramic foam, or any other suitable form. The purification materials can be contained in, for example, a mesh bag.

The purifier is preferably used in a water purification system for a pool. The purifier is connected in series with a pool of water to be purified and a pump. When used to purify swimming pool water, one of the two water purification materials can be a silver-containing material described in U.S. Pat. No. 5,352,369 and in U.S. Ser. No. 08/628,405 and the other can be an oxidizing material such as chlorine (e.g., trichloroisocyanurate or calcium hypochlorite).

Although the two embodiments illustrated in the figures have two internal purification chambers, it should be understood that three or more chambers may be employed, in which case more than two incompatible purification chemicals may be contained within a single canister.

As used in the claims and invention summary, the word pool refers to any swimming pool, hot tub, spa or other body of water for recreational or therapeutic use.

Other configurations and embodiments will occur to those skilled in the art, and are within the scope of the following claims. For example, the water purification device can be used to purify other recirculating bodies of water, such as water in cooling towers.

What is claimed is:

1. A water purification device comprising:
    a. a housing having an inlet and an outlet and through which water may flow; and
    b. means, comprising a cartridge divided into first and second chambers, for providing first and second water flow paths between the inlet and the outlet,
        i. the first chamber containing a first water purification material and defining part of the first water flow path,
        ii. the second chamber containing a second water purification material whose chemical composition differs from that of the first water purification material, wherein the first and second water purification materials would react if brought into physical contact with each other, and defining part of the second water flow path, and
        iii. the cartridge being fitted within the housing so as to retain its position therein when water flows through the housing yet be removable for replacement when desired, being walled such that the first and second chambers have a common wall and being configured so that
            (1) water flowing through the first chamber does not flow through the second chamber,
            (2) water flowing through the second chamber does not flow through the first chamber, and
            (3) the first water purification material in the first chamber does not contact the second water purification material in the second chamber.

2. A device according to claim 1 in which the first water purification material includes silver and the second water purification material includes an oxidizer.

3. A device according to claim 1 further comprising a flow regulator to regulate the flow of water through at least one of the first and second chambers.

4. A device according to claim 3 in which the flow regulator comprises selectable outlet orifice areas.

5. A device according to claim 1 in an elongated cylindrical shape.

6. A water purification device according to claim 1 in which water flowing through each of the first and second chambers initially passes through the inlet.

7. A water purification device according to claim 6 further comprising a tube having a first end communicating with the inlet, the tube adapted to convey water to each of the first and second chambers.

8. A water purification device according to claim 7 in which the tube has side ports for allowing water to flow into the first chamber and a second end, opposite the first end, for allowing water to flow into the second chamber.

9. A water purification device according to claim 8 further comprising a diffuser interposed between the second end of the tube and the second water purification material.

10. A water purification device according to claim 1 in which the endpoints of the first fluid flow path comprise the inlet and the outlet and the endpoints of the second fluid flow path also comprise the inlet and the outlet.

11. A water purification device according to claim 1 in which each of the first and second chambers has a plurality of exit openings, further comprising means for selectively covering at least one of the exit openings of at least one of the first and second chambers.

* * * * *